Figure 1:
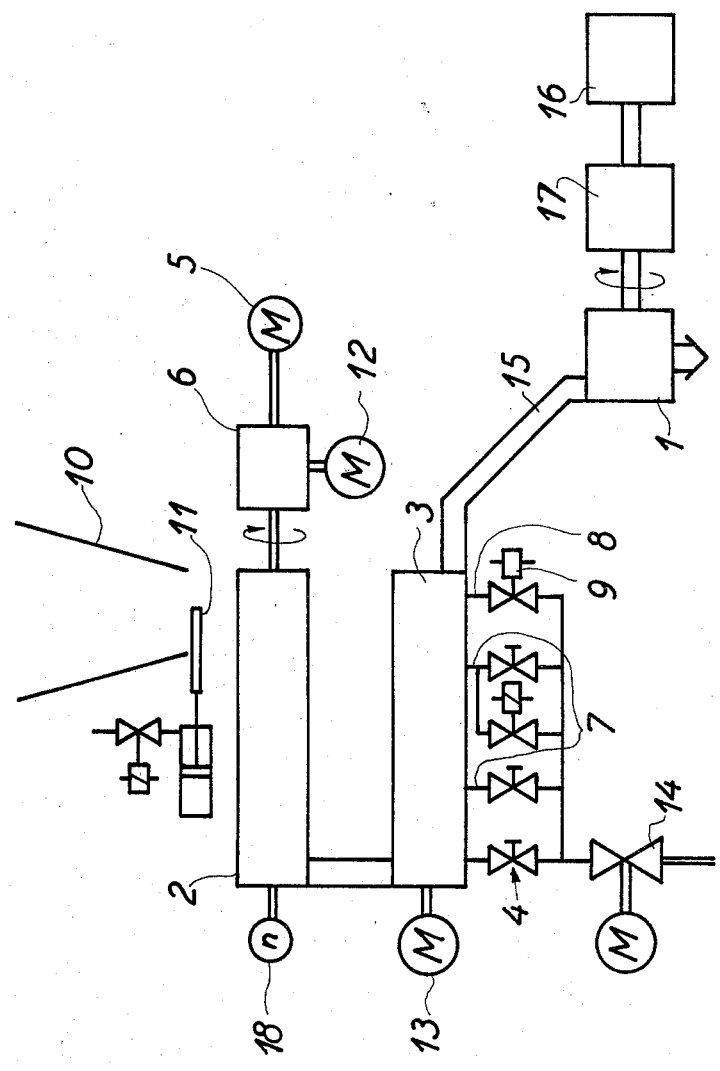

United States Patent [19]

Larsen

[11] 4,327,871
[45] May 4, 1982

[54] METHOD FOR REGULATING A PELLET MILL

[75] Inventor: Ebbe B. B. Larsen, Taastrup, Denmark

[73] Assignee: Norvidan Engineering ApS, Agedrup, Denmark

[21] Appl. No.: 173,297

[22] Filed: Jul. 29, 1980

Related U.S. Application Data

[63] Continuation of Ser. No. 963,723, Nov. 27, 1978, abandoned.

[30] Foreign Application Priority Data

Nov. 30, 1977 [DK] Denmark ............................ 5299/77

[51] Int. Cl.³ .............................................. B02C 25/00
[52] U.S. Cl. ...................................... 241/18; 241/30; 241/33
[58] Field of Search ............. 241/18, 30, 33, 34, 241/35, 23, 65

[56] References Cited

U.S. PATENT DOCUMENTS 3,856,214 12/1974 Kaltenbach et al. ............... 241/34
4,177,951 12/1979 Makuch ............................ 241/35

FOREIGN PATENT DOCUMENTS 1301405 7/1962 France .
527203 7/1977 U.S.S.R. ......................... 241/35

Primary Examiner—Howard N. Goldberg
Attorney, Agent, or Firm—Ladas & Parry

[57] ABSTRACT

The present invention relates to a method for regulation of the temperature of a raw material, particularly ground fodder, which is supplied to a pellet mill by regulating the ratio between the quantity of steam supplied to the raw material and the quantity of raw material supplied to the pellet mill, a quantity of steam being supplied in proportion to the quantity of raw material, so that the proportion is in all essentials constant, whereupon the steam quantity is increased in proportion to the quantity of raw material, until the power consumption of the mill begins to rise, whereafter the quantity of steam is reduced, until the power consumption falls to its minimum, and this new proportion is then maintained during the continued operation. Hereby it is possible to produce forage pellets at the optimum point of the mill, and at the same time it is made sure that no gelatinization takes place. An increase of production of up to 40% over the previously known regulation plants can hereby be achieved.

2 Claims, 2 Drawing Figures

METHOD FOR REGULATING A PELLET MILL

This is a continuation of co-pending application Ser. No. 963,723 filed Nov. 27, 1978 and now abandoned.

The invention relates to a method for regulating the temperature of raw material, for example a ground fodder, which is supplied into a pellet mill by regulating the ratio between the quantity of steam supplied to the raw material and the quantity of raw material supplied to the pellet mill.

When manufacturing forage pellets in a pellet mill of the die ring type, it is most important for the profitability of the plant that the operation conditions are as ideal as possible, as the efficiency will otherwise be poor. The power consumption by pellet mills in very large; therefore a small reduction of the efficiency will be of great importance. Further it is important that the capacity of the mill is utilized in the best possible way.

Before the raw material, for example ground fodder, is supplied into the mill, it is mixed with steam in a so-called conditioning plant, partly in order to let the steam lubricate during the squeezing in the mill and partly in order to ensure that the pellet has the necessary and sufficient binding strength. This supply of steam must be carefully adjusted to the kind and quantity of the raw material in order to ensure that the pelleting takes place at a power consumption which is as low as possible for a particular rate of production. If too much steam is supplied in proportion to a certain quantity of raw material, the fodder will gelatinize in the mill, and this gelatinization will have a blocking effect and thus cause an increased load on the motor and also a considerably reduced efficiency. If the supply of steam is not reduced, or the quantity of raw material is not increased (within the capacity of the mill), the gelatinization will increase until the mill has to be stopped no later than the moment at which the load reaches the maximum motor power.

One of the previously known control and regulation systems is based on a normal adjustment of the supplied quantity of steam and an adjustment of the quantity of raw material, so that the motor is loaded constantly at the required value. The process is thus controlled by regulation of the quantity of the supplied raw material. However, this has proved in practice to be an inexpedient way to regulate a plant of this kind. It is impossible to ensure a constant high efficiency by changing the quantity of the supplied raw material, as there is a great inaccuracy and delay in the regulation on account of the long path followed by the material, for example through the conditioning plant, and on account of the ability of the material to accumulate. This complicates an exact adjustment of the supplied quantity of raw material.

From the description of French Pat. No. 1,301,405 is known a method for regulation of the supply of raw material as well as the supply of steam. The temperature of the conditioned raw materials is regulated in a first regulation circuit by regulation of the supply of steam by means of a separate temperature detector. For a certain temperature there is an optimum value for the supplied quantity of conditioned raw material which corresponds to a minimum motor power in the motor for the mill. In the second regulation circuit a subsequent regulation of the quantity of supplied conditioned raw material is then made on basis of a detection of the motor power. This known method is not very expedient, firstly because it requires two regulation circuits. Secondly the regulation is based on the temperature of the conditioned raw material measured by means of a temperature detector. This gives rise to a great inaccuracy as the nature and the state of the raw material varies and thus also the optimum temperature, whereas the motor power is minimized in that the quantity of the supplied conditioned raw material to the mill is regulated.

It is the object of the invention to improve the known regulation devices for pellet mills and this is achieved by using a method in which the quantity of steam is supplied after start in proportion to the quantity of raw material so that the proportion is in all essentials constant, whereafter the quantity of steam is increased in proportion to the quantity of raw material, until the power consumption of the mill begins to rise, whereupon the quantity of steam is reduced, until the power consumption falls to its minimum, and this new proportion is then maintained during the continued operation, until a change of the properties of the supplied raw material is registered through increased power consumption, whereafter an adjustment of the proportion is made by changing the supplied quantity of steam. Thus, the regulation takes place only by means of a single regulation circuit and the motor power is minimized only through adjusting the supply of steam. In this way an extremely accurate control is achieved, as the steam supply can be regulated within very short intervals on the basis of the easily registered power consumption, just as a constant supply of raw material is comparatively easy to establish using known means. Therefore this method is suitable for an automatic regulation, as the power consumption and the quantity of steam can be coordinated in such a way that the capacity of the mill is utilized to the greatest extent. The efficiency of the mill will thus be considerably improved, as the supply of steam can be highly efficient, whereby the power consumption of the mill motor is minimized per produced unit, so that the production is always carried out at the optimum point of the mill and with security against gelatinization.

This optimum efficiency is achieved in treatment of all kinds of raw material, including mixtures of raw materials which are inhomogeneous. The method is therefore independent of the composition of the raw material. Further the dust formation is considerably reduced, as the pelleting occurs at the right temperature and relative humidity, which ensures that the best possible binding between the individual ingredients of the pellet is achieved. Finally the greatest possible proportion of the micro organisms of the fodder are killed-and thus the feed value is improved, as the pelleting takes place at the highest suitable temperature for the individual type of raw material. The noxious component of the microorganisms in the fodder is thus reduced to the highest possible degree.

Figure 2:
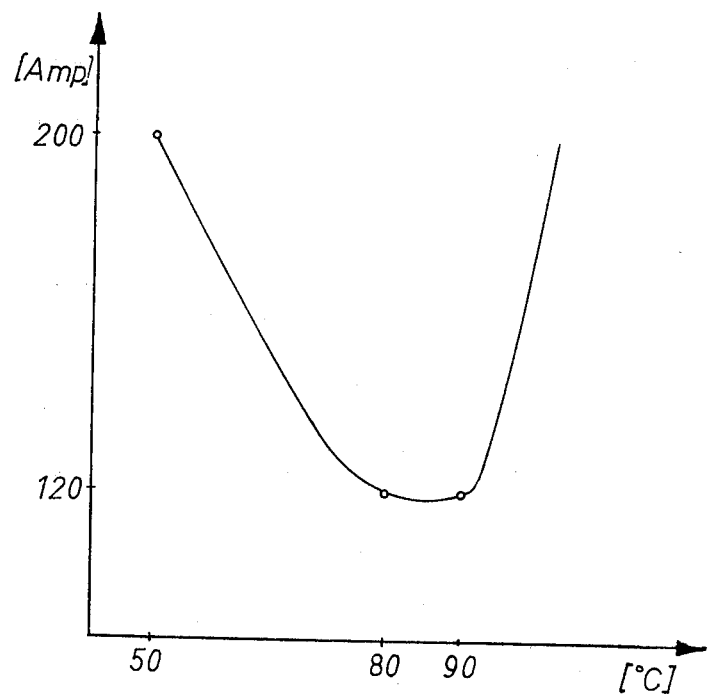

In the following the invention will be further described with reference to the drawing in which FIG. 1 is a schematic view of one embodiment for the plant and FIG. 2 is a diagram showing an example of the influence of the steam quantity on the power consumption of the mill motor.

As it is to be seen from FIG. 1 a plant of this kind for the manufacture of forage pellets may consist of a silo 10 in which the raw material is kept. This raw material may be ground fodder. At the lower part the silo is provided with a remote-controlled silo closure 11. Below the silo closure a conveyor 2 is placed, in this case a generally known worm conveyor, which is driven by a motor 5 via a continuously variable hydraulic gear 6, a so-called cartergear. The gearing and thus the rotary velocity of the worm is varied by means of a gearmotor 12. By altering the gearing 6 and thus the rotary velocity for the worm, the transported quantity of raw material from the silo can be regulated. In the following the transported quantity is called (n), as the rotary velocity of the worm, which can be registered in a revolution counter 18, is proportional to the transported quantity.

From the conveyor 2 the raw material is led to a cascade mixer 3, where it is whipped by means of a rotating mixer, driven by a motor 13. A number of steam supplies 7,8 are connected to this mixer 3, in the shown example four in a row. By adding steam to the raw material in the mixer, a conditioning takes place, as the steam supply will moisten and heat the raw material, so that the subsequent pelleting of the raw material in the mill will be easier, because of the lubricating effect of the moisture, and the finished product will achieve a suitable consistency as well as binding ability and hardness.

The steam supply is regulated by means of valves. At least one valve next to the mill is a remote-controlled magnet valve 9. Further there is a main stop valve 14. The supplied quantity of steam will be called (DV) in the following.

From the conditioning plant 3 the conditioned raw material is led via a passage 15 to the mill 1. This mill may be provided with a generally known ring die. Inside the die a number of press wheels are rotating, driven by a motor 16 via a gear 17. The press wheels are rotated at a constant velocity. The drive motor 16 is during the operation exposed to a load, i.e. has a power consumption which is in the following called (I motor).

The various components of the plant illustrated in FIG. 1 may be remotely controlled, for example from a central control room.

FIG. 2 is a graph showing the relation between the power consumption (I motor) (Amp.) of the drive motor 16 and the added steam quantity measured at the temperature (T raw material) (°C.) of the raw material in the passage 15 at the mill inlet.

The method will hereinafter be described. After starting the plant sufficient steam (DV) is supplied for a certain quantity of raw material (n) that a desired high temperature exceeding a predetermined minimum temperature, which may be for example 50° C. will be attached. Such a temperature may be about 60° C. Then raw material is supplied at a greater rate by increasing the rotary velocity of the conveyor. By means of a regulator the steam quantity (DV) is increased at the same time, so that the proportion (DV/n) is maintained more or less constant.

After this rough regulation a regulation procedure is made, as there will now be an increase of steam supply (DV), whereby the temperature will normally rise and the motor power (I motor) will fall at the same time. When the temperature of the raw material (T raw material) reaches more than 90° C., the rise in temperature will cause a gelatinization of raw material in the mill, which will again cause a rapid increase in power consumption. This increase of the power consumption is registered by an alarm relay which scans the power consumption (I motor) of the motor and the temperature of the raw material (T raw material), (dI/dT max.), whereafter the regulation procedure is interrupted, and the steam supply is reduced. The valve position which caused the beginning of the gelatinization is registered, and when a normal operation situation is reestablished at a temperature below, 90° C. the regulation procedure may be resumed, as the proportion (DV/n) is now adapted to a somewhat lower proportion, i.e. the steam quantity has been reduced compared to the proportion which caused gelatinization to occur.

Thus the system may be adapted to remain around an operation point which is in the described example about 80° C. This is due to the fact that the steam supply, which is to make the system remain around the optimum point at 90° C., is disproportionately expensive compared to the quantity of power which is saved. The economic optimum is therefore a temperature of about 80° C. in the described example. This gives also a certain security against gelatinization.

I claim:

1. Method of regulating the temperature of raw material which is supplied into a pellet mill, comprising the following steps, in the order stated:
   (a) supplying steam to the raw material in a quantity (DV) proportional to the quantity of raw material (n), so that the proportion (DV/n) is essentially constant;
   (b) increasing the quantity of steam (DV) in proportion to the quantity of raw material (n), until the power consumption (I motor) of the mill (4) begins to rise;
   (c) reducing the quantity of steam (DV) until the power consumption falls to a minimum;
   (d) maintaining this new proportion (DV/n) during the continued operation until a change in the properties of the raw material is registered through an increased power consumption; and thereupon
   (e) reducing the power consumption by changing the supplied quantity of steam (DV) without correspondingly changing the quantity of raw material (n), so that the proportion (DV/n) is changed.

2. Method according to claim 1, wherein the steam is supplied to the raw material prior to supplying the raw material into the pellet mill, the steam being supplied to the raw material at a plurality of locations, at least one of which locations is nearer than the other locations to the pellet mill.

* * * * *